United States Patent [19]
Adams

[11] Patent Number: 5,964,517
[45] Date of Patent: Oct. 12, 1999

[54] LIGHTED BARBECUE TOOL

[76] Inventor: Terry K. Adams, 110 Driftwood Crt., Joppa, Md. 21085

[21] Appl. No.: 08/932,525

[22] Filed: Sep. 18, 1997

[51] Int. Cl.⁶ .................................................. B25B 23/18
[52] U.S. Cl. .......................... 362/119; 362/120; 362/394; 362/109
[58] Field of Search .................................... 362/119, 120, 362/109, 394, 200

[56] References Cited

U.S. PATENT DOCUMENTS 5,023,761   6/1991   De Lange .................... 362/120
5,036,442   7/1991   Brown ........................... 362/102

Primary Examiner—Thomas M. Sember

[57] ABSTRACT

A new LIGHTED BARBEQUE TOOL for ALLOWING A PERSON WHO IS GRILLING OUTDOORS TO SEE AT NIGHT. The inventive device includes a barbecue implement having an elongated handle portion and a food handling portion. A pressure activated light source is adapted for coupling with the elongated handle portion of the barbecue implement.

2 Claims, 3 Drawing Sheets

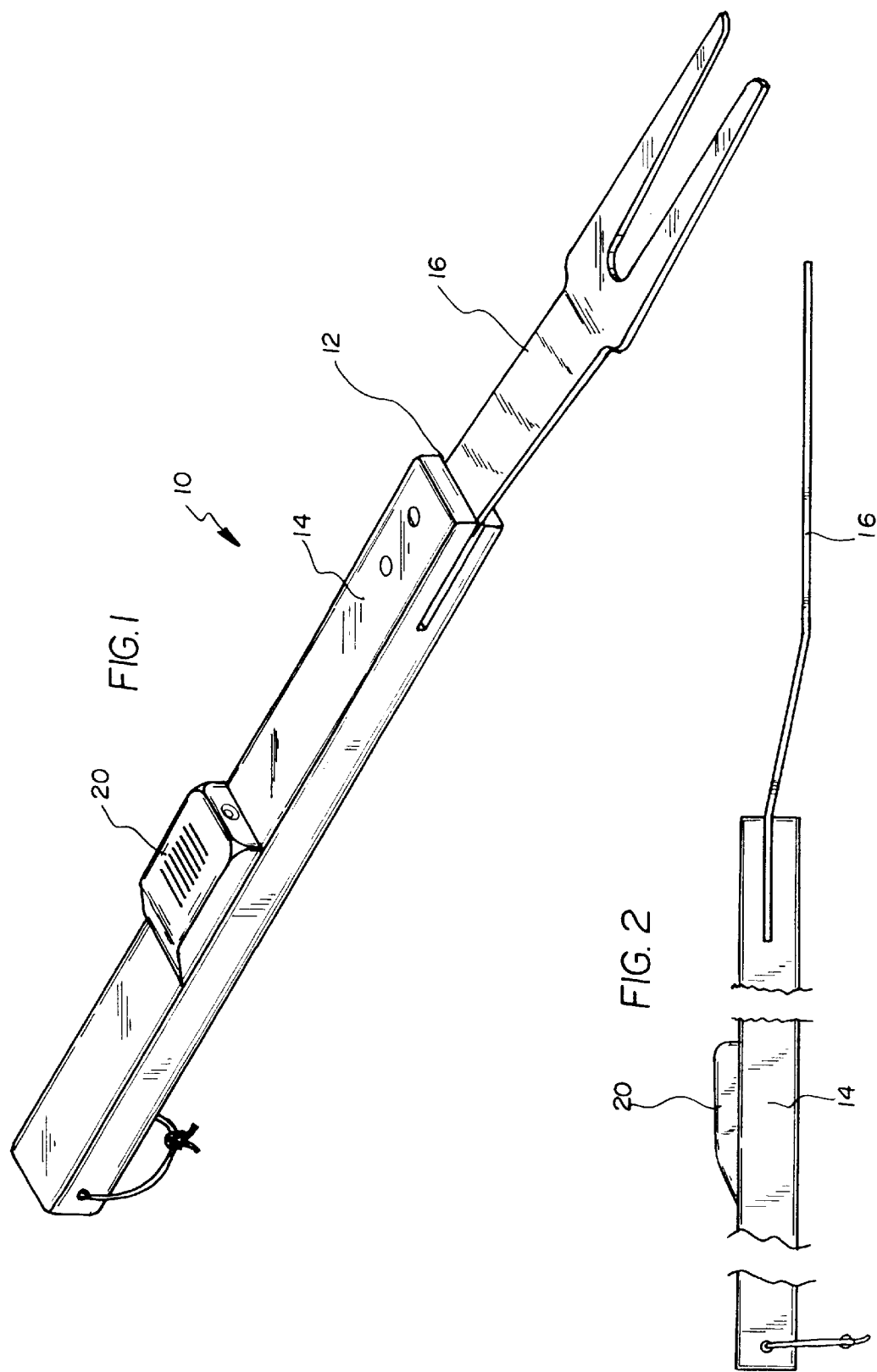

FIG. 3
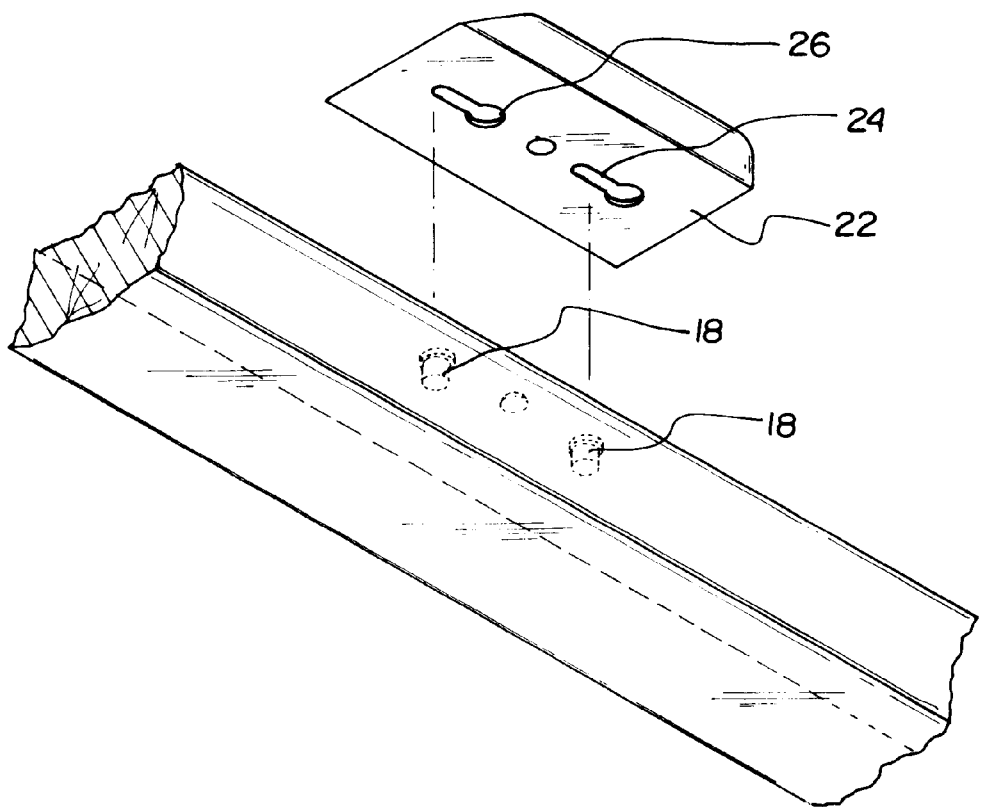
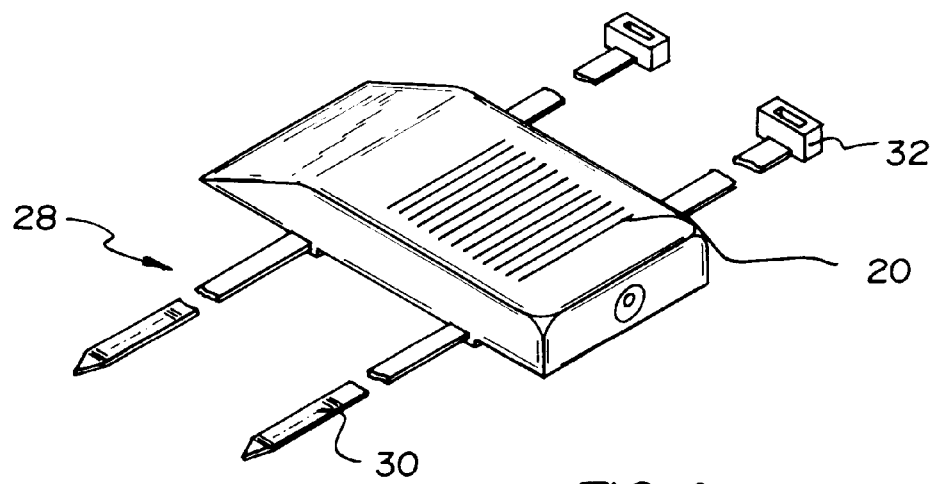
FIG. 4

LIGHTED BARBECUE TOOL

BACKGROUND OF THE INVENTION

1. Field of the Invention

The present invention relates to ILLUMINATED TOOLS and more particularly pertains to a new LIGHTED BARBEQUE TOOL for ALLOWING A PERSON WHO IS GRILLING OUTDOORS TO SEE AT NIGHT.

2. Description of the Prior Art

The use of ILLUMINATED TOOLS is known in the prior art. More specifically, ILLUMINATED TOOLS heretofore devised and utilized are known to consist basically of familiar, expected and obvious structural configurations, notwithstanding the myriad of designs encompassed by the crowded prior art which have been developed for the fulfillment of countless objectives and requirements.

Known prior art ILLUMINATED TOOLS include U.S. Pat. No. 5,023,761 to de Lange; U.S. Pat. No. 3,919,541 to Chao; U.S. Pat. No. Des. 351,092 to Weber; U.S. Pat. No. 4,896,253 to Southworth; U.S. Pat. No. 4,283,757 to Nalobandian et al.; and U.S. Pat. No. 5,206,998 to Oriente et al.

While these devices fulfill their respective, particular objectives and requirements, the aforementioned patents do not disclose a new LIGHTED BARBEQUE TOOL. The inventive device includes a barbecue implement having an elongated handle portion and a food handling portion. A pressure activated light source is adapted for coupling with the elongated handle portion of the barbecue implement.

In these respects, the LIGHTED BARBEQUE TOOL according to the present invention substantially departs from the conventional concepts and designs of the prior art, and in so doing provides an apparatus primarily developed for the purpose of ALLOWING A PERSON WHO IS GRILLING OUTDOORS TO SEE AT NIGHT.

SUMMARY OF THE INVENTION

In view of the foregoing disadvantages inherent in the known types of ILLUMINATED TOOLS now present in the prior art, the present invention provides a new LIGHTED BARBEQUE TOOL construction wherein the same can be utilized for ALLOWING A PERSON WHO IS GRILLING OUTDOORS TO SEE AT NIGHT.

The general purpose of the present invention, which will be described subsequently in greater detail, is to provide a new LIGHTED BARBEQUE TOOL apparatus and method which has many of the advantages of the ILLUMINATED TOOLS mentioned heretofore and many novel features that result in a new LIGHTED BARBEQUE TOOL which is not anticipated, rendered obvious, suggested, or even implied by any of the prior art ILLUMINATED TOOLS, either alone or in any combination thereof.

To attain this, the present invention generally comprises a barbecue implement having an elongated handle portion and a food handling portion. The elongated handle portion has a pair of protrusions extending upwardly from an upper surface thereof. The pair of protrusions are disposed closer to its free end than the food handling portion. A pressure activated light source is adapted for coupling with the elongated handle portion of the barbecue implement. The light source has a lower surface with a pair of slots therethrough. The pair of slots each have a circular forward end for receiving the pair of protrusions therein for coupling of the light source to the barbecue implement.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new LIGHTED BARBEQUE TOOL apparatus and method which has many of the advantages of the ILLUMINATED TOOLS mentioned heretofore and many novel features that result in a new LIGHTED BARBEQUE TOOL which is not anticipated, rendered obvious, suggested, or even implied by any of the prior art ILLUMINATED TOOLS, either alone or in any combination thereof.

It is another object of the present invention to provide a new LIGHTED BARBEQUE TOOL which may be easily and efficiently manufactured and marketed.

It is a further object of the present invention to provide a new LIGHTED BARBEQUE TOOL which is of a durable and reliable construction.

An even further object of the present invention is to provide a new LIGHTED BARBEQUE TOOL which is susceptible of a low cost of manufacture with regard to both materials and labor, and which accordingly is then susceptible of low prices of sale to the consuming public, thereby making such LIGHTED BARBEQUE TOOL economically available to the buying public.

Still yet another object of the present invention is to provide a new LIGHTED BARBEQUE TOOL which provides in the apparatuses and methods of the prior art some of the advantages thereof, while simultaneously overcoming some of the disadvantages normally associated therewith.

Still another object of the present invention is to provide a new LIGHTED BARBEQUE TOOL for ALLOWING A PERSON WHO IS GRILLING OUTDOORS TO SEE AT NIGHT.

Yet another object of the present invention is to provide a new LIGHTED BARBEQUE TOOL which includes a barbecue implement having an elongated handle portion and a food handling portion. A pressure activated light source is adapted for coupling with the elongated handle portion of the barbecue implement.

Still yet another object of the present invention is to provide a ew LIGHTED BARBEQUE TOOL that provides a light source for ase in viewing foods cooked on the grill.

Even still another object of the present invention is to provide new LIGHTED BARBEQUE TOOL that is interchangeable between various types of grilling implements.

These together with other objects of the invention, along with e various features of novelty which characterize the invention, are pointed out with particularity in the claims annexed to and forming art of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new LIGHTED BARBEQUE TOOL according to the present invention.

FIG. 2 is a side elevation view of the present invention.

FIG. 3 is a perspective view of the preferred coupling of the present invention.

FIG. 4 is a perspective view of a second embodiment of the present invention.

DESCRIPTION OF THE PREFERRED EMBODIMENT

Figure 5:
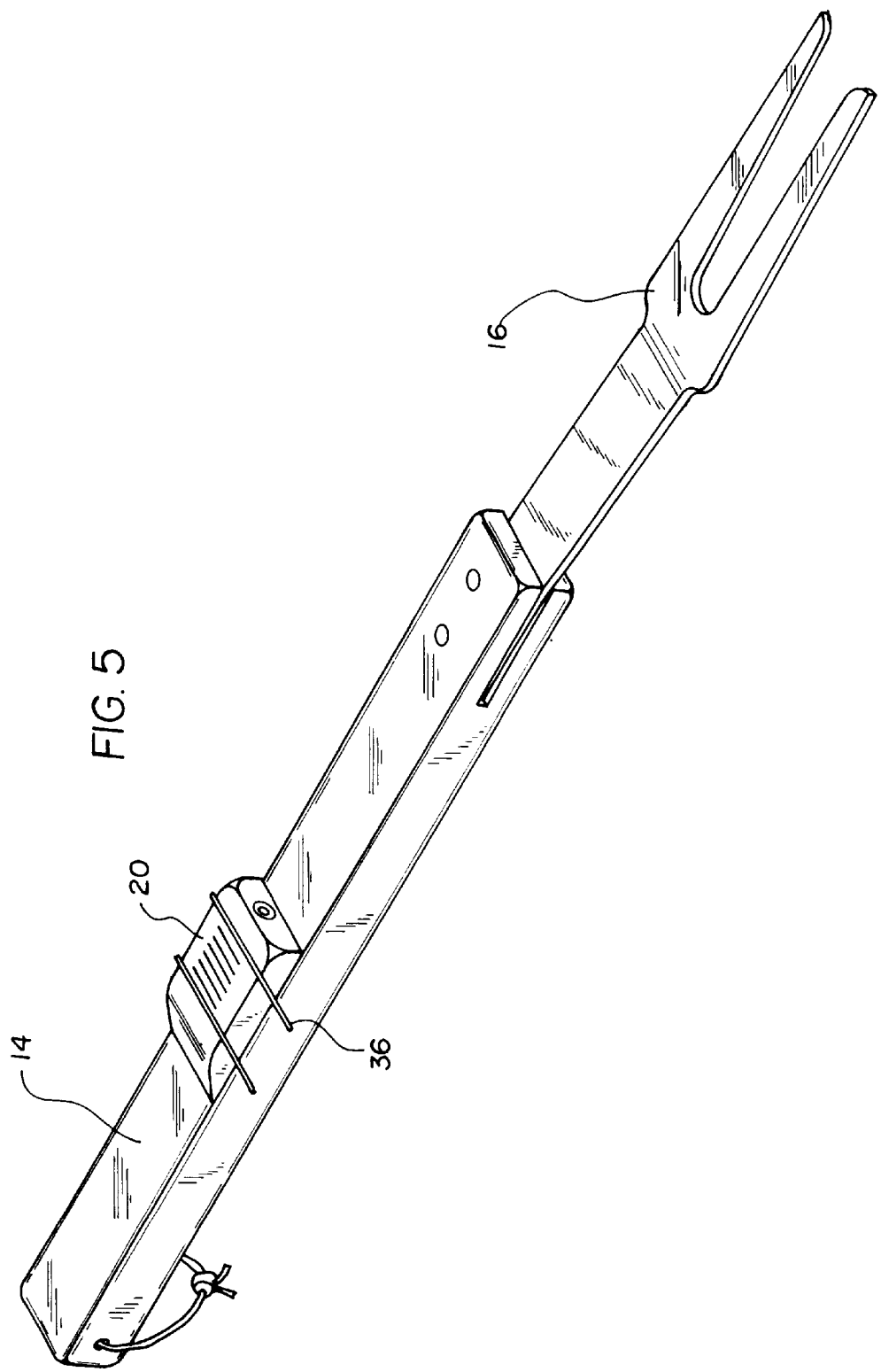
FIG. 5 is a perspective view of a third embodiment of the present invention.

With reference now to the drawings, and in particular to FIGS. 1 through 5 thereof, a new LIGHTED BARBEQUE TOOL embodying the principles and concepts of the present invention and generally designated by the reference numeral 10 will be described.

As best illustrated in FIGS. 1 through 5, the LIGHTED BARBEQUE TOOL 10 comprises a barbecue implement 12 having an elongated handle portion 14 and a food handling portion 16. The elongated handle portion 14 has a pair of protrusions 18 extending upwardly from an upper surface thereof. The pair of protrusions 18 are disposed closer to its free end than the food handling portion 16. The food handling portion 16, as shown in FIGS. 2 and 3, is a fork. Other types of barbecue implements can also be used such as a spatula, tongs, and brush.

A pressure activated light source 20 is adapted for coupling with the elongated handle portion 14 of the barbecue implement 12. The light source 20 has a lower surface 22 with a pair of slots 24 therethrough. The pair of slots 24 each have a circular forward end 26 for receiving the pair of protrusions 18 therein for coupling of the light source 20 to the barbecue implement 12.

A second embodiment of the present invention is illustrated in FIG. 4 and includes essentially all of the elements in the preferred embodiment except that the protrusions 18 and the slots 24 are absent and the activated light source 20 has a pair of tab fasteners 28 extending outwardly therefrom. The tab fasteners 28 each include a male portion 30 and a female portion 32 extending outwardly from opposed sides of the light source 20 for wrapping around the elongated handle portion 14 for removable securement thereto. This embodiment will allow for the light source 20 to be secured to different barbecue implements.

A third embodiment of the present invention is illustrated in FIG. 5 and includes essentially all of the elements in the preferred embodiment except that the protrusions 18 and the slots 24 are absent and the pressure activated light source 20 has a pair of pliable clips 36 for coupling to side walls of the elongated handle portion 14 for removable securement of the light source 20 thereto. This embodiment allows for the light source 20 to be interchanged between various barbecue implements.

In use, while a person is barbecuing at night, they will press on the light source to produce a beam of light that will be directed towards the grill area to allow the person to better visualize the food that they are grilling.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lighted barbecue tool for allowing a person who is grilling outdoors to see at night comprising, in combination:

a barbecue implement having an elongated handle portion and a food handling portion; and a pressure activated light source being detachably coupled to the elongated handle portion of the barbecue implement.

2. A lighted barbecue tool for allowing a person who is grilling outdoors to see at night comprising, in combination:

a barbecue implement having an elongated handle portion and a food handling portion;

a pressure activated light source adapted for coupling with the elongated handle portion of the barbecue implement; and wherein the pressure activated light source has a pair of pliable clips for coupling to side walls of the elongated handle portion for removable securement of the light source thereto.

* * * * *